March 28, 1939.  B. C. REINKENS  2,152,212
DITCHER AND PACKER MACHINE
Filed Aug. 8, 1938   2 Sheets-Sheet 1
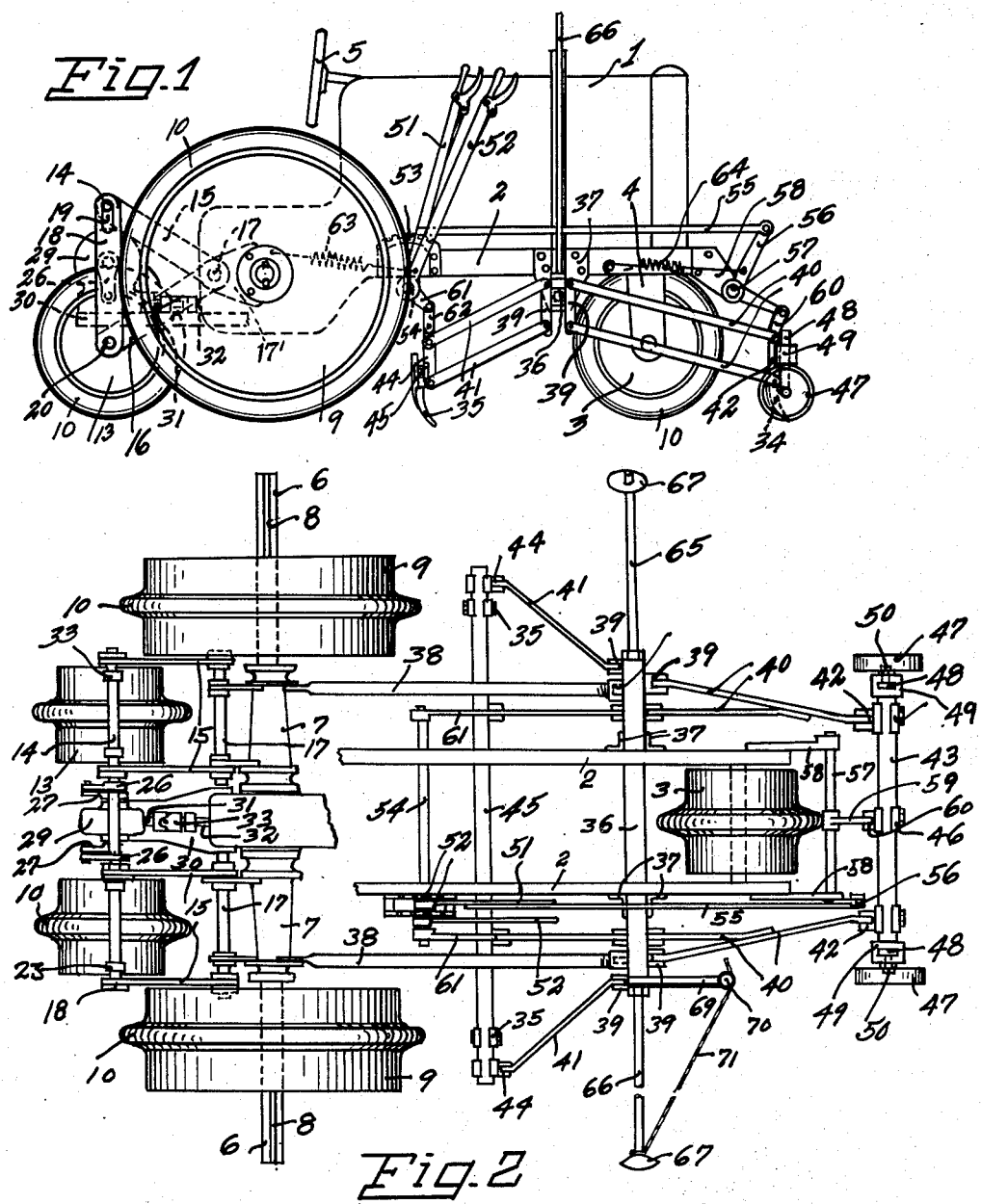
INVENTOR.
Bernard C. Reinkens
BY
ATTORNEYS.

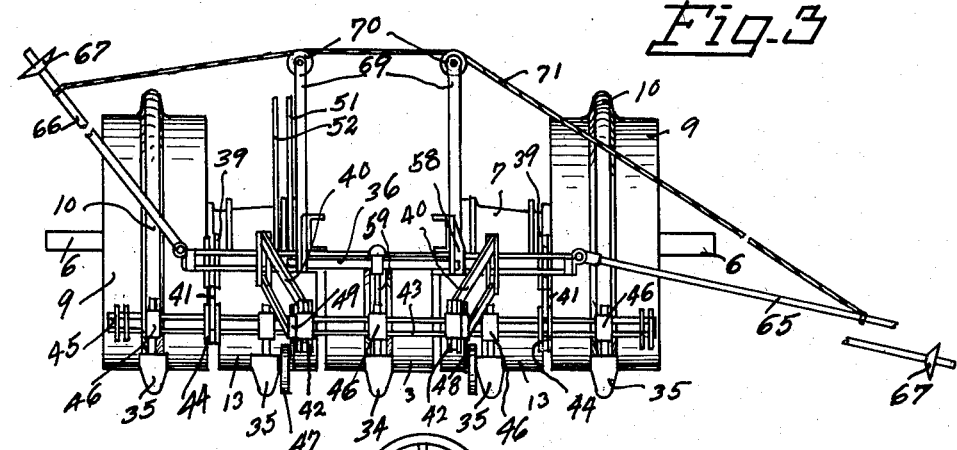
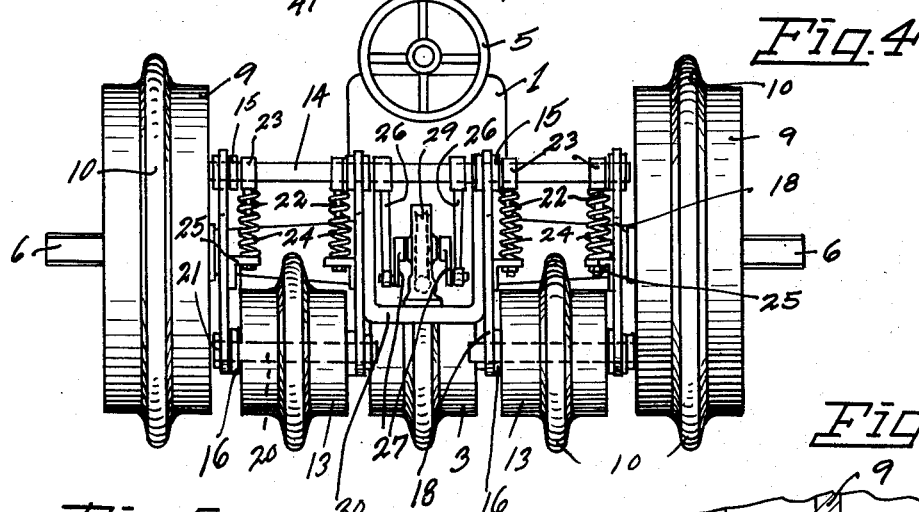
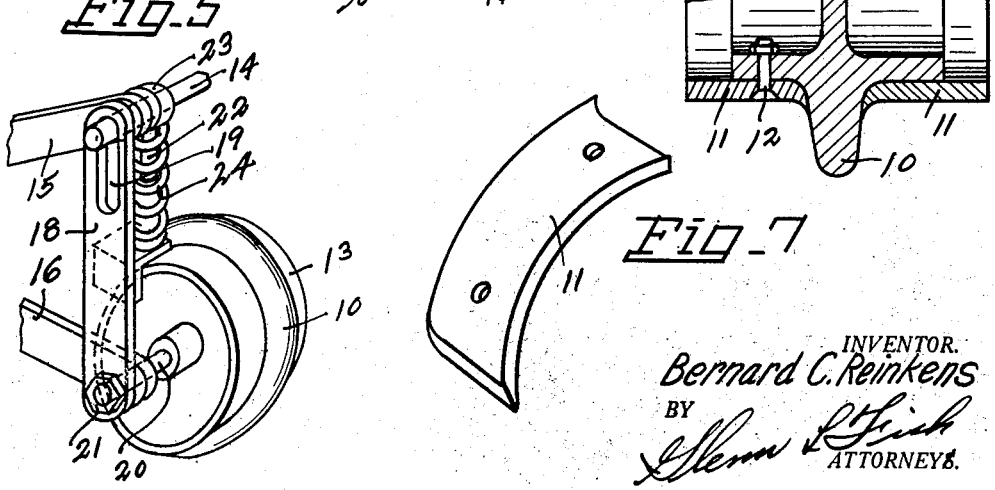

Patented Mar. 28, 1939

2,152,212

UNITED STATES PATENT OFFICE 2,152,212

DITCHER AND PACKER MACHINE

Bernard C. Reinkens, Pasco, Wash.

Application August 8, 1938, Serial No. 223,664

10 Claims. (Cl. 55—46)

This invention relates to a ditcher and packer and more particularly to a ditcher and packer mechanism applied to a tractor of conventional construction adapted to form ditches in ground as the tractor is driven over the ground.

One object of the invention is to provide a machine of this character which includes wheels and rollers for forming ditches, the machine having sufficient weight to cause the walls of the ditches to be well packed and formed with smooth surfaces.

Another object of the invention is to provide a machine of this character having front and rear wheels which, together with auxiliary rear wheels or rollers, form a plurality of ditches spaced transversely from each other, the rear wheels of the tractor being adjustable transversely of the tractor in order that ditches formed thereby may be spaced from a ditch formed by the front wheel a predetermined distance.

It is another object of the invention to so mount the rollers at the rear of the machine that they can be shifted vertically into and out of position to engage the ground and thus permit them to be moved to a raised and inoperative position when so desired.

Another object of the invention is to provide the machine with a plurality of blades mounted in position to enter the ground in front of the wheels and rollers and thus loosen the soil so that the wheels and rollers may compress the loosened ground and form the ditches.

Another object of the invention is to so mount the blades that frames carrying the same may be vertically adjusted and thus shift the blades vertically into and out of position for use and also control the depth to which the blades enter the ground.

Another object of the invention is to provide ditching apparatus of simple construction and which may be easily applied to a tractor of conventional construction.

The invention is illustrated in the accompanying drawings, wherein:

Fig. 1 is a side elevation of the improved ditcher and packer.

Fig. 2 is a top plan view thereof with portions of the tractor broken away for the sake of clearness.

Fig. 3 is a front view with portions of the tractor omitted.

Fig. 4 is a rear view.

Fig. 5 is a fragmentary perspective showing the construction of the mountings for the rear rollers.

Fig. 6 is a sectional view on an enlarged scale taken transversely through the rim of one wheel.

Fig. 7 is a perspective view of an extension applied to a wheel at opposite sides of a rib thereof, as shown in Fig. 6.

The tractor, which is indicated in general by the numeral 1, has the usual chassis frame 2 at the forward end of which is disposed a front wheel 3 which constitutes a guide wheel and is mounted in forks 4 with which the usual steering wheel 5 is connected in the ordinary manner so that the tractor may be steered. The sections of the driving axle 6 project from the housing 7 of the drive shaft or axle and are slotted, as shown at 8, in order that the rear wheels 9, which turn with the axle, may be shifted longitudinally thereof and thus disposed in predetermined lateral spaced relation to the front wheel. These wheels have their rims provided midway of their width with a circumferential rib 10 and from an inspection of Figs. 4 and 6 it will be seen that when the tractor is driven across a field the front and rear wheels will form trenches corresponding in depth to the ribs and having smooth and closely packed walls. By applying hoops or segmental plates 11 to the rims of the wheels at opposite sides of the ribs and securing them by bolts 12, the ribs may be caused to form ditches which are of reduced depth and as the hoops or plates project from opposite sides of the wheel rims, wider wheels will be provided and the tractor permitted to travel easily over soft ground. Plates are preferable to hoops as they may be easily applied or removed.

In addition to forming trenches by means of the front and rear wheels of the tractor, it is also desired to form trenches between these trenches. Therefore, there have been provided rear rollers or auxiliary wheels 13 which are disposed back of the tractor and are of the same formation and size as the front wheel. A shaft 14 extends transversely of the tractor back of the same and is mounted in arms 15. These arms, together with arms 16, project rearwardly from a shaft 17 mounted in brackets 17' carried by the shaft housing 7. The arms or straps 15 and 16 are pivoted to the shaft 17 and between rear or outer ends of the arms extend straps 18 which have their upper end portions formed with slots 19 to receive the shaft 14 and have their lower ends engaged about ends of the axles 20 of the rollers 13 where they are held by the nuts 21. Guide pins 22 are suspended from the shaft 14 by eyes 23 at their upper ends and about these pins are engaged springs 24, the lower ends of which engage brackets 25 carried by the straps 18. These springs urge the straps and the rear rollers downwardly so that the ribs of the rollers will be forced into the ground to form ditches and, in addition, the springs serve as shock absorbers and allow upward movement of the rollers if rocks or other obstructions are encountered. The shaft 14 is mounted in arms or links 26 which have their lower ends pivoted to cranks 27 carried by ends of the shaft or worm gearing enclosed in the gear housing 29 supported on the platform 30 extending rearwardly from the tractor. The shaft 31 of the worm gearing is connected with the rear power take-off shaft 32 of the tractor by a clutch 33 and when the clutch is in operative position the cranks 27 will be moved to shift the links 26 vertically and vertically adjust the shaft 14. Therefore, the rear rollers 13 may be shifted into or out of position to engage the ground and form ditches. It will thus be seen that the machine will form three or five ditches and also that when traveling from one field to another the rear rollers may be shifted to an elevated position where they will be out of the way and not rest on the ground.

When the ditcher is in use it is desirable to break up the ground in front of the wheels and rear rollers and thus permit the ribs of the wheels and rollers to easily form the ditches. Therefore, there have been provided blades 34 and 35 disposed in front of the wheels and rollers, the blade 34 being disposed in front of the front wheel 3 and the blade 35 back of the wheel 3 in advance of the rear wheels 9 and rollers 13. A cross beam 36 extends across the tractor frame back of the front wheel and is secured by brackets 37 carried by the tractor frame. This cross beam is braced by bracing bars or strips 38 extending rearwardly therefrom to the shaft housing 7 and depending strips 39 are carried by the cross beam. Bars or strips 40 and 41 are pivoted to the strips 39 and extend forwardly and rearwardly therefrom, as shown in Fig. 1, front ends of the bars 40 being pivoted to depending strips 42 carried by a front cross bar 43 and the bars 41 having their rear ends pivoted to depending strips 44 carried by a rear cross bar 45. Mountings 46 are carried by the cross bars 43 and 45 and through these mountings are secured the shanks of the blades 34 and 35 so that the blades may be vertically adjusted and caused to enter the ground the proper distance when the cross beams are shifted downwardly to a lowered or operative position. The front cross bar 43 also carries wheels 47 to rest on the ground and these wheels have their axles provided with upturned shanks 48 which pass through sleeves or vertical guides 49 at ends of the cross bar and are secured in set positions by set screws 50.

The blades are to be shifted vertically and supported in set positions so that they may enter the ground a predetermined distance or be supported above the ground while moving the machine from one field to another. In order to accomplish this, there have been provided latch levers 51 and 52. These levers are pivotally mounted at one side of the frame 2 in cooperating relation to racks 53 and are carried by a rocker shaft 54 extending transversely of the frame. A rod 55 extends forwardly from the lever 51 and at its front end is pivoted to an arm 56 rising from a shaft 57 journaled in brackets 58 at opposite sides of the front of the frame 2. Midway its length, the shaft 57 carries a forwardly projecting arm 59 pivoted to the upper end of an arm 60 rising from the front cross bar 43 and it will be readily understood that when the lever is moved to shift the rod 55 longitudinally of the tractor, the cross bar 43 and blade 34 carried thereby will be shifted vertically and secured to an adjusted position. The lever 52 is fixed to the shaft 54 and this shaft, which is rotatably mounted under the frame, carries arms 61 pivoted to arms 62 rising from the cross bar 45. When the lever 52 is adjusted, the shaft 54 will be rocked and the cross bar 45 shifted vertically to move the blades 35 toward or away from the ground and support them in the adjusted position. A spring 63 extends between the shaft housing 7 and the lever 52 and assists movement of the lever in a direction to raise the cross bar 45 and blades carried thereby, and a similar spring 64 is provided between the frame 2 and the arm 56 to assist upward movement of the cross bar 43 and blades 34.

During use of the ditcher, it is driven across a field after properly adjusting the rear rollers and the cross bar and during forward movement of the tractor the blades score the ground to break it up. The wheels and rear rollers follow along the scored ground and their ribs will be forced downwardly by the weight of the machine and action of the springs 24, thus forming ditches having compact and smooth walls so that water may flow through the ditches for irrigation purposes. After reaching an end of a field, the levers are adjusted to raise the blades and the rear rollers also shifted upwardly. The tractor may then be easily turned and driven back across the field after lowering the blades and the rear rollers. The ditches formed during the return trip should be properly spaced from those previously formed and in order to do so, there have been provided rods 65 and 66 which are pivoted to ends of the cross beam 36 and project laterally from opposite sides of the tractor. Scoring discs 67 are rotatably mounted at ends of the rods and during a ditching operation one of the discs will be disposed in engagement with the ground to form a mark serving as a guide when making a return trip across a field. Standards 69 extend upwardly from the tractor frame at opposite sides thereof and carry pulleys 70 at their upper ends for engagement by a cable 71 and from an inspection of Fig. 3, it will be seen that the cable extends transversely across the tractor with its ends secured to the rods 65 and 66. Therefore, when one rod is swung downwardly to a lowered position for use the other rod will be swung upwardly and held in raised position. It will thus be seen that only one rod and its disc will be in position for use and that either rod may be lowered for use, according to the direction in which the tractor is working across the field.

Having thus described the invention, what is claimed is:

1. In a ditching machine, a tractor, a front wheel midway the width of said tractor, rear wheels at opposite sides of said tractor shiftable laterally of the tractor to space them predetermined distances from the longitudinal center of the tractor, rear rollers at the back of the tractor disposed between the rear wheels and spaced from the rear wheels and each other transversely of the tractor, the wheels and rollers having circumferential ribs for forming trenches in the ground as the tractor moves across a field, and means carried by the tractor for breaking up the ground in front of the wheels and rollers.

2. In a ditching machine, a tractor having a frame, a front wheel for the tractor midway the width of the frame, a rear shaft housing extending transversely of the frame, a rear drive shaft journaled through said housing with its end portions projecting from ends thereof and from opposite sides of the tractor, rear wheels upon the projecting portions of said drive shaft and being keyed to the drive shaft to mount the rear wheels for turning with the shaft and sliding adjustment longitudinally thereof, rollers at the rear of the tractor disposed between the rear wheels and at opposite sides of the plane of the front wheel, said wheels and rollers having means for forming trenches as the tractor is driven across a field, and means for breaking up the ground in front of the wheels and rollers.

3. In a ditching machine, a tractor having a center front wheel and rear wheels at its sides, rollers at the back of said tractor spaced from each other transversely thereof, sets of upper and lower arms pivotally mounted and extending rearwardly in diverging relation to each other, a shaft extending transversely of the tractor and supported by rear ends of the upper arms, said rollers having axles rotatably supported by rear ends of the lower arms, hangers pivoted at their lower ends to the axles of said rollers and having their upper end portions formed with vertical slots through which said shaft passes, means yieldably resisting upward movement of the hangers and lower arms, means for vertically adjusting the shaft and upper arms and supporting the rollers in vertically adjusted positions, and means for breaking up ground in front of the wheels and rollers.

4. In a ditching machine, a tractor having a center front wheel and rear wheels at its sides, rollers at the back of said tractor spaced from each other transversely thereof, sets of upper and lower arms pivotally mounted and extending rearwardly in diverging relation to each other, a shaft extending transversely of the tractor and supported by rear ends of the lower arms, hangers pivoted at their lower ends to the axles of said rollers and having their upper end portions formed with vertical slots through which said shaft passes, guide pins suspended from said shaft, brackets carried by said hangers, springs disposed vertically about said pins with their lower ends resting on said brackets and urging the hangers and rollers downwardly to force the rollers into the ground, and means for vertically adjusting the shaft and upper arms and supporting the rollers in vertically adjusted position.

5. In a ditching machine, a tractor having a center front wheel and rear wheels at its sides, rollers at the back of said tractor spaced from each other transversely thereof, sets of upper and lower arms pivotally mounted and extending rearwardly in diverging relation to each other, a shaft extending transversely of the tractor and supported by rear ends of the upper arms, said rollers having axles rotatably supported by rear ends of the lower arms, hangers pivoted at their lower ends to the axles of said rollers and having their upper end portions formed with vertical slots through which said shaft passes, means yieldably resisting upward movement of the hangers and lower arms, a platform at the back of said tractor extending rearwardly under said shaft, a work gear mechanism carried by said platform and including a rotary shaft having cranks, arms extending vertically with their lower ends pivoted to said cranks and their upper ends loosely engaged about said shaft, and means for transmitting rotation from the drive shaft of said tractor to said worm gear mechanism having a clutch for selectively energizing the worm gear mechanism and shifting the arms vertically to vertically adjust the position of the shaft and support the rollers in a predetermined position relative to the ground.

6. In a ditching machine, a tractor having a frame and front and rear wheels, rollers at the back of said frame spaced from each other transversely, the wheels and rollers having ribs adapting them to form ditches as the tractor is moved across a field, a cross beam extending transversely of said tractor under its frame, front and rear cross bars extending transversely of said tractor in front of the front and rear wheels and rollers, bars extending between the cross beam and the cross bars and pivoted thereto to mount the cross bars for vertical swinging movement to adjusted positions, blades carried by and depending from said cross bars in front of the ribs of the wheels and rollers to break up the ground in advance thereof as the tractor moves across a field, latch levers, a rocker shaft having one lever fixed thereto and extending transversely across the frame, arms extending from said shaft and connected with the rear cross bar for supporting the same and moving it to a vertically adjusted position when the lever is adjusted, a rocker shaft at the front of the tractor having forwardly projecting arms connected with the front cross bar and upwardly projecting arms, and rods connecting the upwardly projecting arms with the second lever.

7. In a ditching machine, a tractor having a frame and front and rear wheels, a cross beam extending transversely of said tractor and supported under its frame between the front and rear wheels, a forward cross bar in front of the front wheel, a rear cross bar in front of the rear wheels, arms extending longitudinally of said tractor between the cross beam and the cross bars and pivoted thereto, blades suspended below said cross bars, and means to shift the cross bars vertically and hold the same in set positions with the blades in predetermined relation to the ground.

8. In a ditching machine, a tractor having a frame and front and rear wheels, a cross beam extending transversely of said tractor and supported under its frame between the front and rear wheels, a forward cross bar in front of the front wheel, a rear cross bar in front of the rear wheels, arms extending longitudinally of said tractor between the cross beam and the cross bars and pivoted thereto, blades suspended below said cross bars, front and rear rocker shafts extending transversely of the tractor and having arms projecting therefrom and connected with the cross bars, and means for rocking the rocker shafts to shift the cross bars and blades vertically to hold the blades in predetermined relation to the ground.

9. In a ditching machine, a tractor having a frame and front and rear wheels, a cross beam extending transversely of said tractor and supported under its frame between the front and rear wheels, a forward cross bar in front of the front wheel, a rear cross bar in front of the rear wheels, arms extending longitudinally of said tractor between the cross beam and the cross bars and pivoted thereto, blades suspended below said cross bars, front and rear rocker shafts extending transversely of the tractor and having arms projecting therefrom and connected with the cross bars, latch levers carried by the rear rocker shaft, one lever being fixed to the shaft and the other loose thereon, a rod extending forwardly from the loose lever and pivoted to an arm rising from the front shaft, and a rack for said levers carried by said frame.

10. In a ditching machine, a tractor having a frame and front and rear wheels, a cross beam extending transversely of said tractor and supported under its frame, front and rear cross bars extending transversely of the tractor in front of the wheels, blades carried by and depending from said cross bars, means for shifting the cross bars vertically and moving the blades into and out of position to break up ground in front of the wheels, said wheels having means for compressing the broken up ground and forming ditches, standards rising from said cross beam, pulleys carried by said standards, rods pivoted to ends of said cross beam and pivoted for vertical swinging movement from a raised position to a lowered position in which they extend longitudinally from the cross beam at opposite sides of the tractor for use, scoring discs at ends of said rods, and a cable extending transversely of said tractor in engagement with said pulleys and having its ends secured to said rods, said cable constituting a flexible connection between the rods and causing one rod to be swung upwardly to a raised position while the other is swinging downwardly to a lowered position.

BERNARD C. REINKENS.